C. A. PARSONS, S. S. COOK AND L. M. DOUGLAS.
THRUST BEARING.
APPLICATION FILED MAY 5, 1921.

1,403,914.　　　　　　　　　　Patented Jan. 17, 1922.
2 SHEETS—SHEET 1.

INVENTORS:
Charles A. Parsons
Stanley S. Cook
Louis M. Douglas
by Spear, Middleton, Donaldson & Hall
Attys.

C. A. PARSONS, S. S. COOK AND L. M. DOUGLAS.
THRUST BEARING.
APPLICATION FILED MAY 5, 1921.

1,403,914.

Patented Jan. 17, 1922.
2 SHEETS—SHEET 2.

INVENTORS:
CHARLES A. PARSONS,
STANLEY S. COOK,
LOUIS M. DOUGLAS.

By Spear, Middleton, Donaldson & Hall
Attys

UNITED STATES PATENT OFFICE.

CHARLES ALGERNON PARSONS, STANLEY SMITH COOK, AND LOUIS MORTIMER DOUGLAS, OF NEWCASTLE-UPON-TYNE, ENGLAND; SAID COOK AND SAID DOUGLAS ASSIGNORS TO SAID PARSONS.

THRUST BEARING.

1,403,914.   Specification of Letters Patent.   Patented Jan. 17, 1922.

Application filed May 5, 1921. Serial No. 466,969.

*To all whom it may concern:*

Be it known that we, CHARLES ALGERNON PARSONS, STANLEY SMITH COOK, and LOUIS MORTIMER DOUGLAS, all subjects of the King of Great Britain and Ireland, and all residing at Heaton Works, Newcastle-upon-Tyne, in the county of Northumberland, England, have invented certain new and useful Improvements in and Relating to Thrust Bearings, (for which we have filed an application in Great Britain, No. 11089, dated April 21, 1920,) of which the following is a specification.

This invention relates to thrust bearings of the type in which the thrust is taken by pads or blocks pivotally mounted on a suitable carrying member.

In a typical thrust bearing, the pivoted thrust pads are arranged to transmit thrust from a collar on the rotating part to the carrying member mounted on a seat within the casing or direct to the casing itself, and in many applications of such bearings, as for example to the rotor shaft of a turbine, it is of great importance that the correct longitudinal position of the shaft and collar relative to the casing should be maintained within narrow limits.

We have found that if the adjustment of the longitudinal position of the shaft relative to the stator is made when the shaft is not rotating, considerable variations from this relative position are liable to occur when the shaft revolves. It is obvious that with a general increase of temperature, differential thermal expansion of the various parts has some influence on this relative position, but such influence is comparatively small and in practice an approximate allowance can be made for it by making the adjustment with the whole bearing heated, say by pumping through the casing lubricating oil at its estimated average working temperature. We have found, however, as the result of careful experiment, that even with a thrust bearing so adjusted, considerable variations still occur under working conditions, and that the cause of this variation is as follows:—

When carrying heavy pressures with high rubbing speeds, although the co-efficient of friction is very small, the rate of generation of frictional heat per unit of surface is high and a large proportion of it is communicated in the first place to the surface of the collar and the pads, which in consequence reach a high temperature. This is particularly so in the case of the pads, because they are only in metallic contact with the adjacent members over very small areas, so that the frictional heat is not readily conducted to the contacting members or to the more or less stationary oil surrounding them.

Moreover, in thrust bearings as at present constructed, having several pads co-operating with the same face of a collar, if from any cause the longitudinal clearances of the individual pads on the same working face of the collar are different, the pad or pads having the smallest oil clearance will absorb an unduly large share of the thrust and will in consequence get hotter and expand to a greater extent than the remaining pads; the inequality in the distribution of the thrust will in consequence be accentuated, and the relative longitudinal position of rotor and stator above referred to still further increased.

Thus, a three-fold disadvantage arises as the result of local heating. Firstly, the clearances are diminished with consequent increase of friction; secondly, the pressure is distributed unequally among the pads; and thirdly, the longitudinal position of the rotor is disturbed.

The object of the present invention is to overcome the above-mentioned difficulties and provide a construction of thrust bearing which will more accurately and definitely than heretofore has been possible, determine the longitudinal position of the rotating member relative to the stationary casing without the variations referred to above.

The invention consists in making the pivoted pads of a thrust bearing, and in some cases also the members adjacent to the pads, of a material which does not vary in dimensions with varying temperature or a material having an extremely small positive or negative coefficient of thermal expansion.

More specifically, the invention consists in making the pivoted pads or adjuncts referred to in the preceding paragraph of the nickel steel commercially known as "invar" or steel containing about 36% of nickel.

The invention also consists in the improved thrust blocks hereinafter described.

Referring to the accompanying drawings in which, when desirable, the same reference letters are used to denote corresponding parts:—

Figure 1:
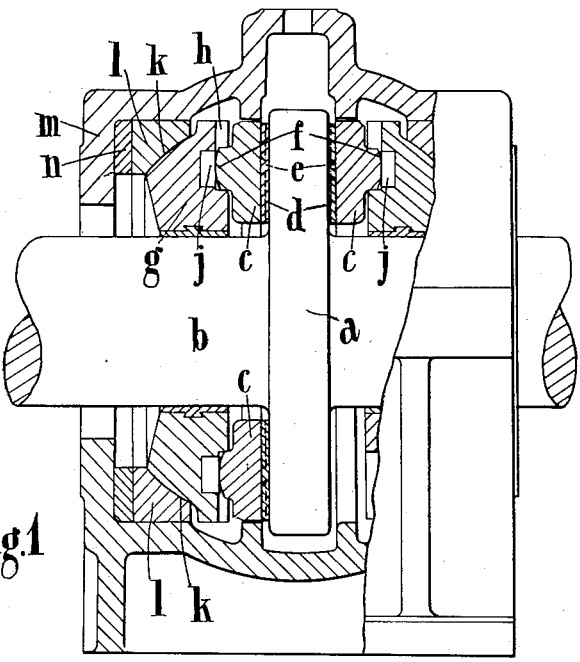
Figure 1 shows a view for the most part as a sectional elevation of one form of the invention, Figure 2 being as regards its right-hand side a corresponding end view, as regards the upper part of its left-hand side a cross-section with the shaft collar removed locking on the pads, and as regards the lower part of its left-hand side a similar cross-section but with the pads removed in addition.
Figure 2:
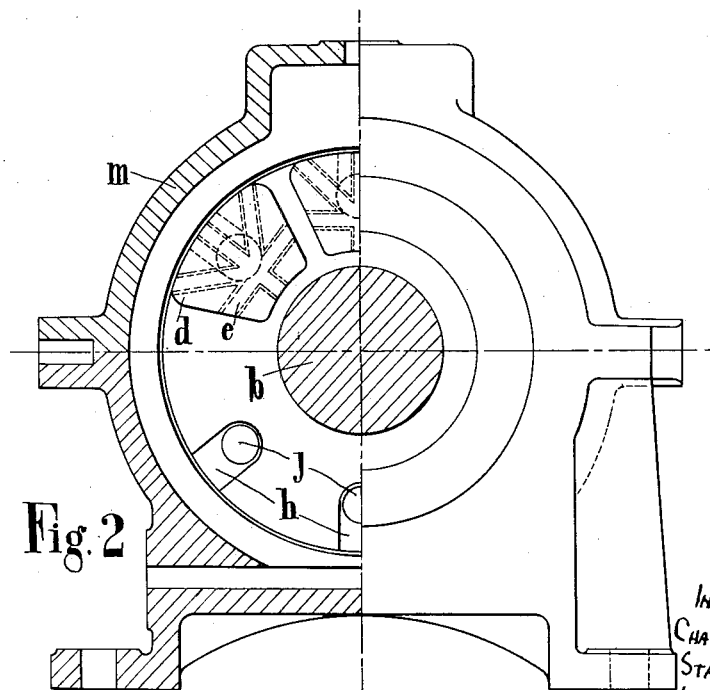

In carrying the invention into effect according to the illustrative form shown in Figures 1 and 2, as applied to a bearing such as that described in the specification of British Patent No. 29810 of 1912 granted to one of the present applicants, the collar, A, of the shaft, B, is retained between two sets of pads, C, each of which is faced with bearing metal, D, let into undercut grooves, E, as indicated, and provided on its near face with a projection, F, having a convex face of slight curvature. The carrying member, G, is provided with a number of radial slots, H, into which the projection F, can be slid, while at the base of each slot is a hardened steel pin, J, on which the projections, F, bear. The carrying member, G, is also provided with a spherical bearing surface, K, which co-acts with a corresponding surface on the seat, L, while finally between the seat, L, and the walls, M, of the casing, a liner, N, is inserted for adjustment purposes.

Figure 3:
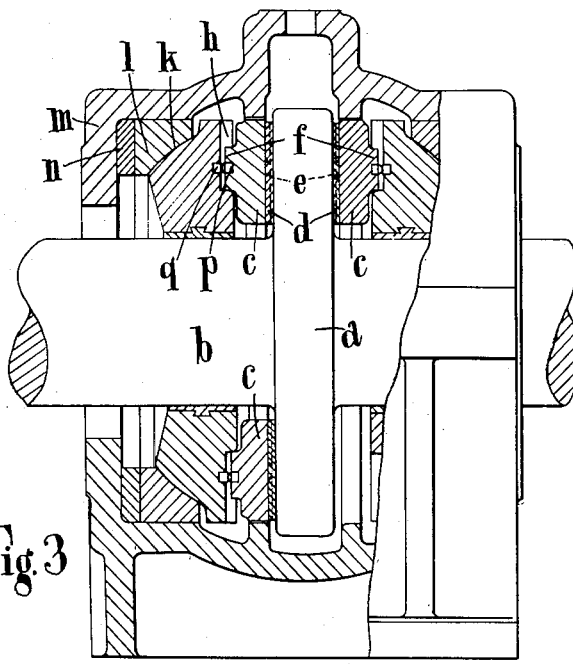
Figures 3 and 4 show similar views of a modified form of the invention.
Figure 4:
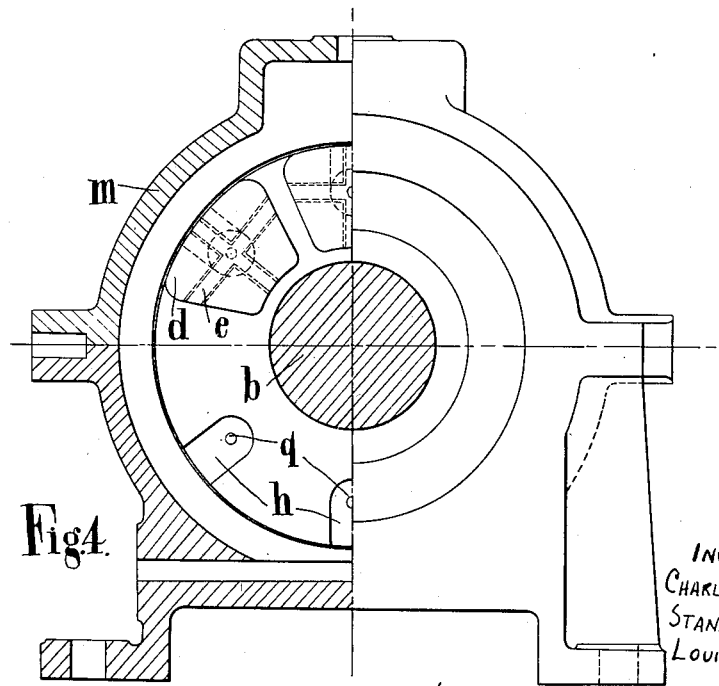

According to the modified form of the invention shown in Figures 3 and 4 each pad, C, has a projection, F, on its back as before, but the projection is provided with a hardened steel pin, P, co-acting with a similar pin, Q, let into the carrying member, G. One of the pins of each co-acting pair is convex and the other flat as shown.

In such constructions the longitudinal clearance provided to permit the functional passage of the oil between the working faces of the pads and collar is limited, and when the parts are made of the materials usually employed the development of frictional heat reduces this longitudinal clearance and consequently increases the resistance to rotation. This increased resistance in turn tends to reduce the clearance still further and it will be seen that there will be a limit to the speed at which the collar can be rotated, that is, to the rate at which heat can be generated without automatically extinguishing the clearance altogether, or reducing it to such an extent as to prevent the normal functional tilting of the pads.

To overcome these difficulties, the pads, C, in accordance with the present invention, are made of a material such as "invar" steel, the dimensions of which vary only to a very slight extent with variations of temperature.

It may, in some cases, be necessary to make the shaft collar, A, and the members, G, L and N, which carry the pads, C, and transmit their thrust to the casing, of a similar non-expanding material, but in general the difficulties referred to above will be overcome by making the pads only, or the pads and their pivot pins, of such material.

If a facing metal is used on the pads, as in the examples illustrated, it may be made of a material having a low co-efficient of thermal expansion, but usually it will be sufficient to make the facing thin, as shown. This facing can be made so thin that its expansion in the longitudinal direction with any increase in temperature below the temperature at which the facing metal begins to flow, can only be a relatively small amount.

It will be seen that this invention is applicable to any pivoted thrust bearing in which the shaft is to be retained accurately in a definite longitudinal position. It is applicable, for example, to a pivoted thrust bearing in which there are pressure pads on one side only of the collar or collars, such as a footstep bearing.

When the phrase "pivoted pad" is mentioned in the claim, it may include the member or members adjacent to the pads.

Having now described our invention, what we claim as new and desire to secure by Letters Patent is:—

A pivoted pad for a thrust block made of "invar" steel, substantially as described.

In testimony whereof we have signed our names to this specification.

CHARLES ALGERNON PARSONS.
STANLEY SMITH COOK.
LOUIS MORTIMER DOUGLAS.